US00RE48797E

(19) United States
(12) Reissued Patent
Andersson et al.

(10) Patent Number: US RE48,797 E
(45) Date of Reissued Patent: Oct. 26, 2021

(54) BONE CONDUCTION DEVICE HAVING A MULTILAYER PIEZOELECTRIC ELEMENT

(71) Applicant: COCHLEAR LIMITED, Macquarie University (AU)

(72) Inventors: Marcus Andersson, Gothenburg (SE); Kristian Asnes, Molndal (SE); Erik Holgersson, Gothenburg (SE); Patrik W. Stromsten, Molnlycke (SE); Wim Bervoets, Wilrijk (BE)

(73) Assignee: Cochlear Limited, Macquarie University (AU)

(21) Appl. No.: 16/396,895

(22) Filed: Apr. 29, 2019

Related U.S. Patent Documents

Reissue of:
(64) Patent No.: 8,837,760
Issued: Sep. 16, 2014
Appl. No.: 12/731,988
Filed: Mar. 25, 2010

U.S. Applications:
(63) Continuation of application No. 15/254,237, filed on Sep. 1, 2016, now abandoned, which is an application for the reissue of Pat. No. 8,837,760.

(30) Foreign Application Priority Data

Mar. 25, 2009 (DE) ..... 10200914770.5

(51) Int. Cl.
*H04R 25/00* (2006.01)
*H04R 17/00* (2006.01)
*H04R 1/24* (2006.01)

(52) U.S. Cl.
CPC ..... *H04R 17/00* (2013.01); *H04R 25/606* (2013.01); *H04R 1/24* (2013.01); *H04R 2225/67* (2013.01); *H04R 2460/13* (2013.01)

(58) Field of Classification Search
CPC .. H04R 25/606; H04R 17/00; H04R 2460/13; H04R 2225/67; H04R 1/24
See application file for complete search history.

(56) References Cited

U.S. PATENT DOCUMENTS 2,045,403 A 6/1936 Nicholides
2,045,404 A 6/1936 Nicholides ..... H04R 17/00 381/151

(Continued)

FOREIGN PATENT DOCUMENTS

DE 915826 7/1954
DE 19643180 4/1997

(Continued)

OTHER PUBLICATIONS

European Search Report and Search Opinion for European Application No. 10157853.2 dated Jan. 30, 2013 (9 pages).

(Continued)

*Primary Examiner* — Catherine S Williams
(74) *Attorney, Agent, or Firm* — Edell, Shapiro & Finnan, LLC

(57) ABSTRACT

A bone conduction device comprising a multilayer piezoelectric element. The multilayer piezoelectric element comprises two stacked piezoelectric layers, and a flexible passive layer disposed between the piezoelectric layers. The device also comprises a mass component attached to the multilayer piezoelectric element; and a coupling attached to the multilayer piezoelectric element configured to transfer mechanical forces generated by the multilayer piezoelectric element and the mass component to a recipient's skull.

25 Claims, 8 Drawing Sheets

(56) References Cited

U.S. PATENT DOCUMENTS

| | | | | |
|---|---|---|---|---|
| 2,045,427 | A | 6/1936 | White | |
| 2,239,550 | A | 4/1941 | Cubert | |
| 3,594,514 | A | 7/1971 | Wingrove | |
| 4,475,014 | A * | 10/1984 | King | H04R 1/24 381/190 |
| 4,498,461 | A | 2/1985 | Hakansson | |
| 4,612,915 | A | 9/1986 | Hough et al. | |
| 4,904,233 | A | 2/1990 | Hakansson | |
| 4,937,489 | A | 6/1990 | Hattori et al. | |
| 4,952,835 | A | 8/1990 | Stahlhuth | |
| 4,964,106 | A | 10/1990 | Bromfield | |
| 5,228,092 | A | 7/1993 | Nakamura et al. | |
| 5,245,245 | A | 9/1993 | Goldenberg | |
| 5,276,910 | A * | 1/1994 | Buchele | H04B 5/0012 381/79 |
| 5,286,199 | A | 2/1994 | Kipke | |
| 5,444,324 | A | 8/1995 | Priest et al. | |
| 5,589,725 | A | 12/1996 | Haertling | |
| 5,772,575 | A | 6/1998 | Lesinski et al. | |
| 5,788,711 | A | 8/1998 | Lehner et al. | |
| 6,273,681 | B1 | 8/2001 | Yamakawa et al. | |
| 6,294,859 | B1 | 9/2001 | Jaenker | |
| 6,358,281 | B1 * | 3/2002 | Berrang et al. | 623/10 |
| 6,371,415 | B1 | 4/2002 | Lorkowski et al. | |
| 6,411,009 | B2 | 6/2002 | Jaenker | |
| 6,463,157 | B1 | 10/2002 | May | |
| 6,554,761 | B1 | 4/2003 | Puria et al. | |
| 6,629,922 | B1 | 10/2003 | Puria et al. | |
| 6,631,197 | B1 | 10/2003 | Taenzer | |
| 6,751,334 | B2 | 6/2004 | Hakansson | |
| 6,927,528 | B2 | 8/2005 | Barillot et al. | |
| 6,994,110 | B2 | 2/2006 | Barillot et al. | |
| 7,026,746 | B2 | 4/2006 | Audren et al. | |
| 7,045,932 | B2 | 5/2006 | Xu et al. | |
| 7,224,815 | B2 | 5/2007 | Maltan et al. | |
| 7,378,783 | B2 | 5/2008 | Pelrine et al. | |
| 7,722,524 | B2 | 5/2010 | Lupin et al. | |
| 7,951,063 | B2 * | 5/2011 | Berrang et al. | 600/25 |
| 2002/0015507 | A1 | 2/2002 | Harris et al. | |
| 2002/0039427 | A1 | 4/2002 | Whitwell et al. | |
| 2003/0048915 | A1 | 3/2003 | Bank | |
| 2003/0137218 | A1 | 7/2003 | Hermle et al. | |
| 2005/0020873 | A1 * | 1/2005 | Berrang et al. | 600/25 |
| 2006/0023908 | A1 | 2/2006 | Perkins et al. | |
| 2006/0025648 | A1 | 2/2006 | Lupin et al. | |
| 2007/0041595 | A1 | 2/2007 | Caranzo et al. | |
| 2007/0113649 | A1 | 5/2007 | Bharti et al. | |
| 2007/0156011 | A1 | 7/2007 | Westerkull | |
| 2007/0191673 | A1 | 8/2007 | Ball et al. | H04R 25/606 600/25 |
| 2009/0030529 | A1 * | 1/2009 | Berrang et al. | 623/25 |
| 2009/0052698 | A1 | 2/2009 | Rader et al. | |
| 2009/0115292 | A1 | 5/2009 | Ueda et al. | |
| 2009/0245553 | A1 | 10/2009 | Parker | |
| 2009/0245555 | A1 * | 10/2009 | Parker et al. | 381/326 |
| 2009/0247810 | A1 | 10/2009 | Parker et al. | |
| 2009/0247811 | A1 | 10/2009 | Parker | |
| 2009/0248085 | A1 | 10/2009 | Parker | |
| 2009/0248086 | A1 | 10/2009 | Parker | |
| 2010/0179375 | A1 | 7/2010 | Andersson | |
| 2010/0225600 | A1 * | 9/2010 | Dai et al. | 345/173 |
| 2010/0298626 | A1 * | 11/2010 | Andersson et al. | 600/25 |
| 2011/0158443 | A1 * | 6/2011 | snes et al. | 381/326 |
| 2012/0088956 | A1 * | 4/2012 | Asnes et al. | 600/25 |

FOREIGN PATENT DOCUMENTS

| | | | |
|---|---|---|---|
| EP | 1542499 | | 6/2005 |
| EP | 1542499 | A3 | 6/2005 |
| JP | 59-178986 | | 10/1984 |
| JP | 64-073781 | | 3/1989 |
| JP | 01-290272 | | 11/1989 |
| JP | 9163477 | | 6/1997 |
| WO | 01/93635 | | 12/2001 |
| WO | 0193633 | | 12/2001 |
| WO | 0193634 | | 12/2001 |
| WO | 200193633 | | 12/2001 |
| WO | 200193634 | | 12/2001 |
| WO | 2001093635 | | 12/2001 |
| WO | 03001846 | | 1/2003 |
| WO | 2003096744 | | 11/2003 |
| WO | 2004032566 | | 4/2004 |
| WO | 2005/006809 | A1 | 1/2005 |
| WO | 2005025267 | | 3/2005 |
| WO | 2007024657 | | 3/2007 |
| WO | 2007052251 | | 5/2007 |
| WO | 2007066262 | | 6/2007 |
| WO | 2007111405 | | 10/2007 |
| WO | 2008143573 | | 11/2008 |
| WO | 2009121104 | | 10/2009 |
| WO | 2009121116 | | 10/2009 |

OTHER PUBLICATIONS

Janocha, "Actuators: Basics and Applications", Springer Vertag 2004, Jul. 8, 2009, pp. 265-267.

International Application No. PCT/AU2009/000358, International Preliminary Report on Patentability dated Oct. 5, 2010, 7 Pages.

International Application No. PCT/AU2009/000358, International Search Report dated Jul. 14, 2009, 4 Pages.

International Application No. PCT/AU2009/000358, Written Opinion dated Jul. 14, 2009, 6 Pages.

International Application No. PCT/AU2009/000372, International Preliminary Report on Patentability dated Oct. 5, 2010, 8 Pages.

International Application No. PCT/AU2009/000372, International Search Report dated Jun. 29, 2009, 3 Pages.

International Application No. PCT/AU2009/000372, Written Opinion dated Jun. 29, 2009, 7 Pages.

International Application No. PCT/SE2008/000336, International Search Report dated Sep. 3, 2008, 4 Pages.

Examination Report in corresponding European application No. 10157853.2, dated Dec. 20, 2017, 5 pages.

Extended European Search Report in counterpart European Application No. 20207264.1—1207, dated Mar. 29, 2021, 29 pages.

Qing-Ming Wang et al., "Constitutive Equations of Symmetrical Triple Layer Piezoelectric Benders", IEEE Transactions on Ultrasonics, Ferroelectrics, and Frequency Control, vol. 46, No. 6, Nov. 1999, 9 pages.

Sichel, et al. "New Approach for Implantable Hearing Aids: A Feasibility Study" Ann Otol Rhinol Laryngol. 113:2004, pp. 936-940.

Selection guide for piezo actuators. Cedrat Technologies—Piezo Products Catalogue—Version 3.0—Sep. 2003.

Piezomechanik GmbH. Piezoelectric bending actuators Disk Translators ("bimorphs") Piezoelectric tubes. pp. 1-12.

Janocha, "Actuators: Basics and Applications", Springer Verlag 2004, Jul. 8, 2009, pp. 265-267.

Juuti, et al., "Mechanically Amplified large displacement piezoelectric actuators", Sensors and Actuators A 120, Dec. 22, 2004, pp. 225-231.

International Application No. PCT/AU2009/000358, International Preliminary Report on Patentability mailed on Oct. 5, 2010, 7 Pages.

International Application No. PCT/AU2009/000358, International Search Report mailed on Jul. 14, 2009, 4 Pages.

International Application No. PCT/AU2009/000358, Written Opinion mailed on Jul. 14, 2009, 6 Pages.

International Application No. PCT/AU2009/000372, International Preliminary Report on Patentability mailed on Oct. 5, 2010, 8 Pages.

International Application No. PCT/AU2009/000372, International Search Report mailed on Jun. 29, 2009, 3 Pages.

International Application No. PCT/AU2009/000372, Written Opinion mailed on Jun. 29, 2009, 7 Pages.

International Application No. PCT/SE2008/000336, International Search Report mailed on Sep. 3, 2008, 4 Pages.

Zhou, et al., "Analysis of a diamond-shaped mechanical amplifier for a piezo actuator", Int J Adv Manuf Technol, vol. 32, 2007, pp. 1-7.

(56) References Cited

OTHER PUBLICATIONS

European Search Report and Search Opinion for European Application No. 10157853.2 mailed Jan. 30, 2013 (9 pages).

* cited by examiner

BONE CONDUCTION DEVICE HAVING A MULTILAYER PIEZOELECTRIC ELEMENT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

The present application claims priority from German Patent Application No. 102009014770.5, filed Mar. 25, 2009, which is hereby incorporated by reference herein.

BACKGROUND

1. Field of the Invention

The present invention relates generally to bone conduction devices, and more particularly, to a bone conduction device having a multilayer piezoelectric element.

2. Related Art

Hearing loss, which may be due to many different causes, is generally of two types, conductive and sensorineural. Sensorineural hearing loss is due to the absence or destruction of the hair cells in the cochlea that transduce sound signals into nerve impulses. Various prosthetic hearing implants have been developed to provide individuals who suffer from sensorineural hearing loss with the ability to perceive sound. One such prosthetic hearing implant is referred to as a cochlear implant. Cochlear implants use an electrode array implanted in the cochlea of a recipient to bypass the mechanisms of the ear. More specifically, an electrical stimulus is provided via the electrode array directly to the auditory nerve, thereby causing a hearing sensation.

Conductive hearing loss occurs when the normal mechanical pathways that provide sound to hair cells in the cochlea are impeded, for example, by damage to the ossicular chain or ear canal. However, individuals suffering from conductive hearing loss may retain some form of residual hearing because the hair cells in the cochlea may remain undamaged.

Still other individuals suffer from mixed hearing losses, that is, conductive hearing loss in conjunction with sensorineural hearing. Such individuals may have damage to the outer or middle ear, as well as to the inner ear (cochlea).

Individuals suffering from conductive hearing loss are typically not candidates for a cochlear implant due to the irreversible nature of the cochlear implant. Specifically, insertion of the electrode assembly into a recipient's cochlea exposes the recipient to potential destruction of the majority of hair cells within the cochlea. Typically, destruction of the cochlea hair cells results in the loss of residual hearing in the portion of the cochlea in which the electrode assembly is implanted.

Rather, individuals suffering from conductive hearing loss typically receive an acoustic hearing aid, referred to as a hearing aid herein. Hearing aids rely on principles of air conduction to transmit acoustic signals to the cochlea. In particular, a hearing aid typically uses an arrangement positioned in the recipient's ear canal or on the outer ear to amplify a sound received by the outer ear of the recipient.

This amplified sound reaches the cochlea causing motion of the perilymph and stimulation of the auditory nerve.

Unfortunately, not all individuals who suffer from conductive hearing loss are able to derive suitable benefit from hearing aids. For example, some individuals are prone to chronic inflammation or infection of the ear canal thereby eliminating hearing aids as a potential solution. Other individuals have malformed or absent outer ear and/or ear canals resulting from a birth defect, or as a result of medical conditions such as Treacher Collins syndrome or Microtia. Furthermore, hearing aids are typically unsuitable for individuals who suffer from single-sided deafness (total hearing loss only in one ear). Hearing aids commonly referred to as "cross aids" have been developed for single sided deaf individuals. These devices receive the sound from the deaf side with one hearing aid and present this signal (either via a direct electrical connection or wirelessly) to a hearing aid which is worn on the opposite side. Unfortunately, this requires the recipient to wear two hearing aids. Additionally, in order to prevent acoustic feedback problems, hearing aids generally require that the ear canal be plugged, resulting in unnecessary pressure, discomfort, or other problems such as eczema.

As noted above, hearing aids rely primarily on the principles of air conduction. However, other types of devices commonly referred to as bone conducting hearing aids or bone conduction devices, function by converting a received sound into a mechanical force. This force is transferred through the bones of the skull to the cochlea and causes motion of the cochlea fluid. Hair cells inside the cochlea are responsive to this motion of the cochlea fluid and generate nerve impulses which result in the perception of the received sound. Bone conduction devices have been found suitable to treat a variety of types of hearing loss and may be suitable for individuals who cannot derive sufficient benefit from acoustic hearing aids, cochlear implants, etc, or for individuals who suffer from stuttering problems.

SUMMARY

In one aspect of the present invention, a bone conduction device for converting received acoustic signals into a mechanical force for delivery to a recipient's skull is provided. The bone conduction device comprises: a multilayer piezoelectric element comprising two stacked piezoelectric layers, and a flexible passive layer disposed between and mounted to the piezoelectric layers, wherein the piezoelectric layers are configured to deform in response to application thereto of electrical signals generated based on the received sound signals; a mass component attached to the multilayer piezoelectric element so as to move in response to deformation of the piezoelectric element; and a coupling configured to attach the device to the recipient so as to transfer mechanical forces generated by the multilayer piezoelectric element and the mass component to the recipient's skull.

In another aspect of the present invention, a bone conduction device for converting received acoustic signals into a mechanical force for delivery to a recipient's skull is provided. The bone conduction device comprises: a multilayer piezoelectric element comprising two stacked piezoelectric layers separated by a substantially flexible passive layer, wherein the piezoelectric layers have opposing directions of polarization such that application of electric signals, generated based on the sound signals, to both of the layers causes deflection of the piezoelectric element in a single direction; a mass component attached to the multilayer piezoelectric element so as to move in response to deformation of the piezoelectric element; and a coupling configured to attach the device to the recipient so as to transfer mechanical forces generated by the multilayer piezoelectric element and the mass component to the recipient's skull.

BRIEF DESCRIPTION OF THE DRAWINGS

Embodiments of the present invention are described below with reference to the attached drawings, in which.

DETAILED DESCRIPTION

Embodiments of the present invention are generally directed to a bone conduction device for converting a received sound signal into a mechanical force for delivery to a recipient's skull. The bone conduction device comprises a multilayer piezoelectric element having two or more stacked piezoelectric layers, and a flexible passive layer disposed between the piezoelectric layers. The piezoelectric layers are configured to deform in response to application thereto of electrical signals generated based on the received sound signals The bone conduction device also includes a mass component attached to the multilayer piezoelectric element so as to move in response to deformation of the piezoelectric element, and a coupling configured to attach the device to the recipient. The coupling transfers mechanical forces generated by the multilayer piezoelectric element and the mass component to the recipient's skull.

The voltage of an electric field or electrical signal utilized to actuate a multilayer element may be lower than the voltage utilized in to actuate a single layer piezoelectric device. That is, a higher voltage electric field is required to generate a desired deflection of a single piezoelectric element than is required to generate the same desired deflection of a multilayer piezoelectric element. As such, bone conduction devices having a multilayer piezoelectric element in accordance with embodiments of the present invention have the advantage of requiring less power lower to produce desired mechanical force for delivery to a recipient's skull.

Figure 1:
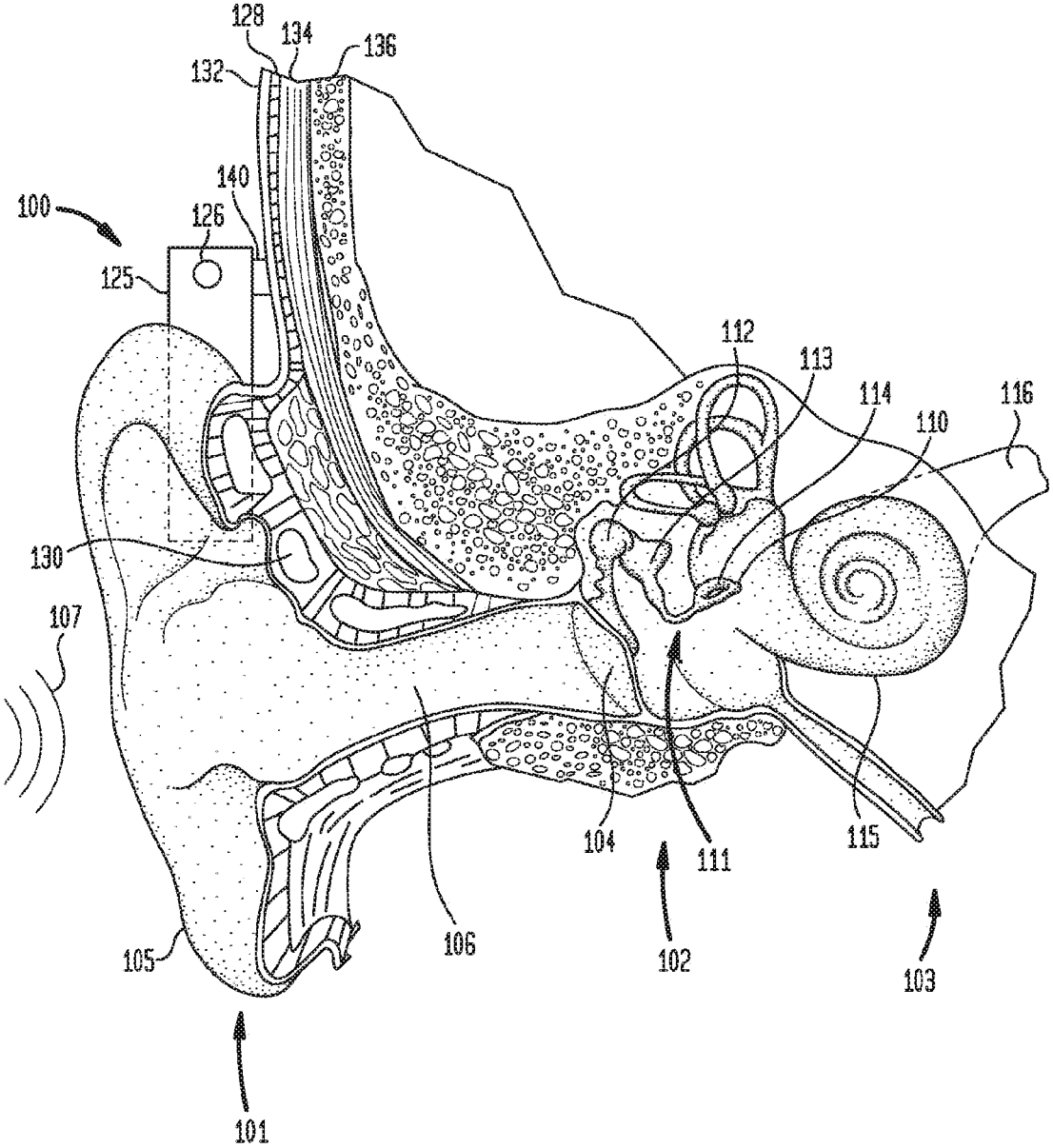
FIG. 1 is a perspective view of an exemplary bone conduction device worn behind a recipient's ear.

As noted above, bone conduction devices have been found suitable to treat a variety of types of hearing loss and may suitable for individuals who cannot derive suitable benefit from acoustic hearing aids, cochlear implants, etc. FIG. 1 is a perspective view of a bone conduction device 100 in which embodiments of the present invention may be advantageously implemented. As shown, the recipient has an outer ear 101, a middle ear [105] *102,* and an inner ear [107] *103*. Elements of outer ear 101, middle ear [105] *102,* and inner ear [107] *103* are described below, followed by a description of bone conduction device 100.

In a fully functional human hearing anatomy, outer ear 101 comprises an auricle 105 and an ear canal 106. A sound wave or acoustic pressure 107 is collected by auricle 105 and channeled into and through ear canal 106. Disposed across the distal end of ear canal 106 is a tympanic membrane 104 which vibrates in response to acoustic wave 107. This vibration is coupled to oval window or fenestra ovalis 110 through three bones of middle ear 102, collectively referred to as the ossicles 111 and comprising the malleus 112, the incus 113 and the stapes 114. Bones 112, 113 and 114 of middle ear 102 serve to filter and amplify acoustic wave 107, causing oval window 110 to articulate, or vibrate. Such vibration sets up waves of fluid motion within cochlea 115. Such fluid motion, in turn, activates tiny hair cells (not shown) that line the inside of cochlea 115. Activation of the hair cells causes appropriate nerve impulses to be transferred through the spiral ganglion cells and auditory nerve 116 to the brain (not shown), where they are perceived as sound.

FIG. 1 also illustrates the positioning of bone conduction device 100 relative to outer ear 101, middle ear 102 and inner ear 103 of a recipient of device 100. As shown, bone conduction device 100 may be positioned behind outer ear 101 of the recipient. In the embodiment illustrated in FIG. 1, bone conduction device 100 comprises a housing 125 having a sound input element 126 positioned in, on or coupled to housing 125. Sound input element 126 is configured to receive sound signals and may comprise, for example, a microphone, telecoil, etc. As described below, bone conduction device 100 may comprise a sound processor, a piezoelectric actuator and/or various other electronic circuits/devices which facilitate operation of the device. For example, as described further below, bone conduction device 100 comprises actuator drive components configured to generate and apply an electric field to the piezoelectric actuator. In certain embodiments, the actuator drive components comprise one or more linear amplifiers. For example, class D amplifiers or class G amplifiers may be utilized, in certain circumstances, with one or more passive filters. More particularly, sound signals are received by sound input element 126 and converted to electrical signals. The electrical signals are processed and provided to the piezoelectric element. As described below, the electrical signals cause deformation of the piezoelectric element which is used to output a force for delivery to the recipient's skull.

Bone conduction device 100 further includes a coupling 140 configured to attach the device to the recipient. In the specific embodiments of FIG. 1, coupling 140 is attached to an anchor system (not shown) implanted in the recipient. In the illustrative arrangement of FIG. 1, anchor system comprises a percutaneous abutment fixed to the recipient's skull bone 136. The abutment extends from bone 136 through muscle 134, fat 128 and skin 132 so that coupling 140 may be attached thereto. Such a percutaneous abutment provides an attachment location for coupling 140 that facilitates efficient transmission of mechanical force. A bone conduction device anchored to a recipient's skull is sometimes referred to as a bone anchored hearing aid (Baha). Baha is a registered trademark of Cochlear Bone Anchored Solutions AB (previously Entific Medical Systems AB) in Goteborg, Sweden.

It would be appreciated that embodiments of the present invention may be implemented with other types of couplings and anchor systems. Exemplary couplings and anchor systems that may be implemented in accordance with embodiments of the present invention include those described in the following commonly owned and co-pending U.S. patent application Ser. No. 12/167,796, entitled "SNAP-LOCK COUPLING SYSTEM FOR A PROSTHETIC DEVICE," U.S. patent application Ser. No. 12/167,851, entitled "TANGENTIAL FORCE RESISTANT COUPLING SYSTEM FOR A PROSTHETIC DEVICE," U.S. patent application Ser. No. 12/167,871, entitled "MECHANICAL FIXATION SYSTEM FOR A PROSTHETIC DEVICE," U.S. patent application Ser. No. 12/167,825, entitled, "TISSUE INJECTION FIXATION SYSTEM FOR A PROSTHETIC DEVICE," U.S. patent application Ser. No. 12/168,636, entitled "TRANSCUTANEOUS MAGNETIC BONE CONDUCTION DEVICE," U.S. patent application Ser. No. 12/168,603, entitled "HEARING DEVICE HAVING ONE OR MORE IN-THE-CANAL VIBRATING EXTENSIONS," and U.S. patent application Ser. No. 12/168,620, entitled "PIERCING CONDUCTED BONE CONDUCTION DEVICE." The contents of these applications are hereby incorporated by reference herein. Additional couplings and/or anchor systems which may be implemented are described in U.S. Pat. No. 3,594,514, U.S. Patent Publication No. 2005/0020873, U.S. Patent Publication No. 2007/0191673, U.S. Patent Publication No. 2007/0156011, U.S. Patent Publication No. 2004/0032962, U.S. Patent Publication No. 2006/0116743 and International Application No. PCT/SE2008/000336. The contents of these applications are hereby incorporated by reference herein.

As noted, a bone conduction device, such as bone conduction device 100, utilizes a vibrator or actuator to generate a mechanical force for transmission to the recipient's skull. As described below, embodiments of the present invention utilize a multilayer piezoelectric element to generate the desired force. Specifically, the multilayer piezoelectric element comprises two or more active piezoelectric layers each mounted to a passive layer. The piezoelectric layers mechanically deform (i.e. expand or contract) in response to application of the electrical signal thereto. This deformation (vibration) causes motion of a mass component attached to the piezoelectric element. The deformation of the piezoelectric element and the motion of the mass component generate a mechanical force that is transferred to the recipient's skull. The direction and magnitude of deformation of a piezoelectric element in response to an applied electrical signal depends on material properties of the layers, orientation of the electric field with respect to the polarization direction of the layers, geometry of the layers, etc. As such, modifying the chemical composition of the piezoelectric layer or the manufacturing process may impact the deformation response of the piezoelectric element. It would be appreciated that various materials have piezoelectric properties and may implemented in embodiments of the present invention. One commonly used piezoelectric material is lead zirconate titanate, commonly referred to as (PZT).

Figure 2A:
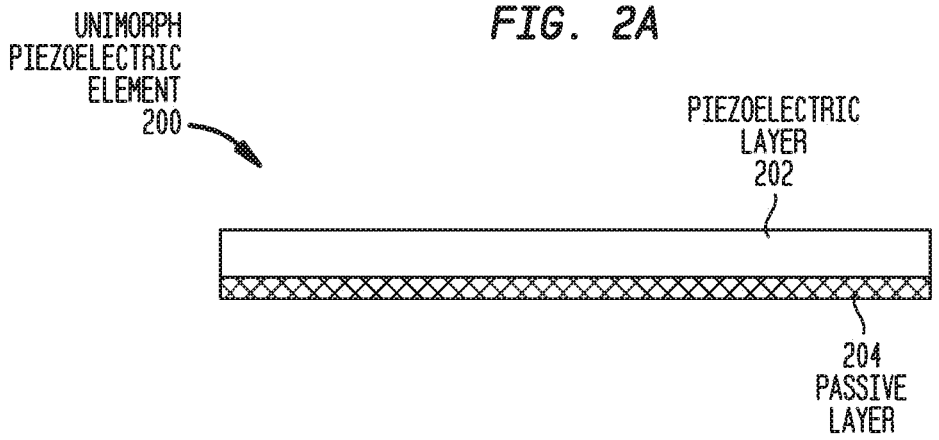
FIG. 2A is a schematic side view of a unimorph piezoelectric element, shown prior to application of an electric field to the element.
Figure 2B:
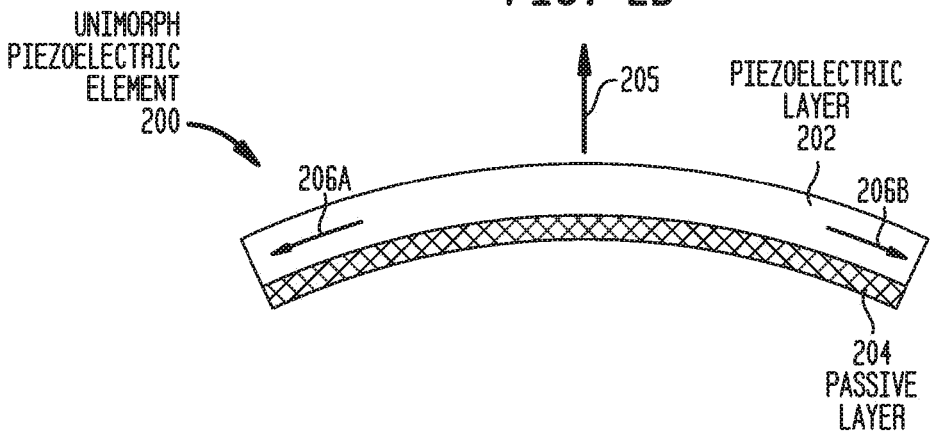
FIG. 2B is a schematic side view of the unimorph piezoelectric element of FIG. 2A, shown after application of an electric field to the element.

FIGS. 2A and 2B are schematic side view of one piezoelectric element referred to as unimorph piezoelectric element 200. FIG. 2A illustrates unimorph piezoelectric element 200 prior to application of an electric field thereto, while FIG. 2B illustrates the element after application of an electric field. For ease of illustration, electrodes for applying an electric field to piezoelectric element 200 have been omitted from FIGS. 2A and 2B.

Unimorph piezoelectric element 200 comprises a piezoelectric layer 202 mounted to a passive layer 204. It would be appreciated that layer 204 may be any one or more of a number of different materials. In one embodiment, layer 204 is a metal layer. In the exemplary configuration of FIG. 2A, layers 202, 204 each have a generally planar orientation. However, when an electric field is applied to piezoelectric layer 202, the layer expands longitudinally as illustrated by arrows 206. Because passive layer 204 does not substantially expand, the centers of both layers 202 and 204 deflect in the direction illustrated by arrow 205 to take a concave orientation. As described elsewhere herein, the deflection of layers 202, 204 is used to generate vibration of the recipient's skull.

Unimorph piezoelectric element 200 is shown as having a piezoelectric strip layer 202 having a generally rectangular geometry. However, piezoelectric layers 202 may comprise, for example, piezoelectric disks or piezoelectric plates. Additionally, layers 202 and 204 are shown having a planar configuration prior to application of an electric field to layer 202. However, it would be appreciated that layers 202 and 204 may have a concave shape prior to application of the electric field.

Figure 3A:
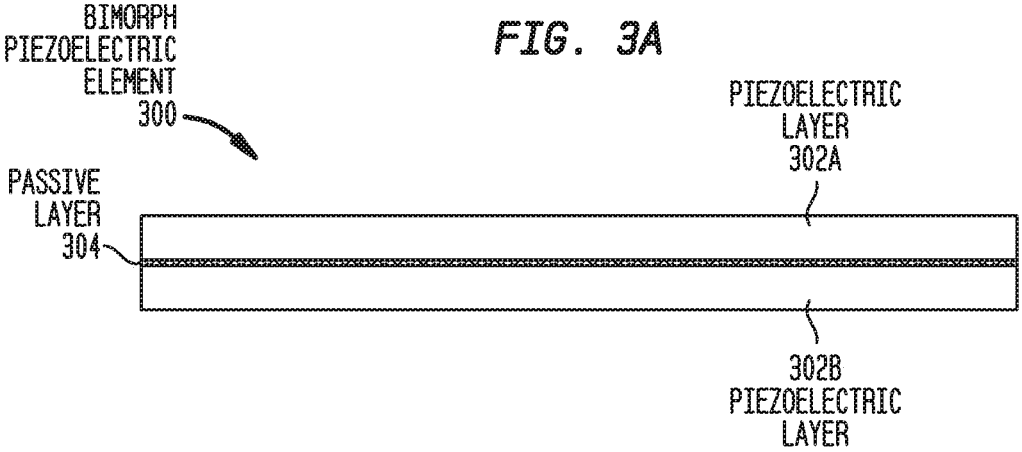
FIG. 3A is a schematic side view of a bimorph piezoelectric element which may be implemented in embodiments of the present invention, shown prior to application of an electric field to the element.
Figure 3B:
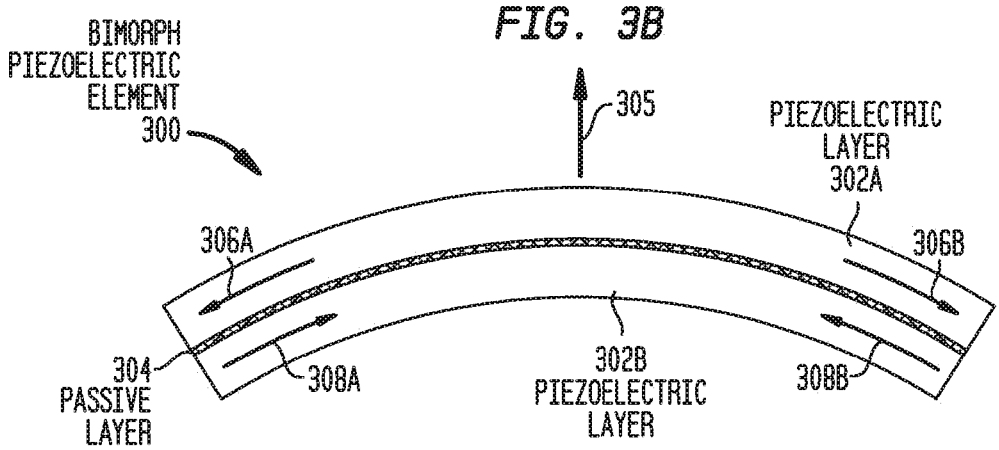
FIG. 3B is a schematic side view of the bimorph piezoelectric element of FIG. 3A, shown after application of an electric field to the element.

FIGS. 3A and 3B are schematic side view of an exemplary multilayer piezoelectric element which may be implemented in embodiments of the present invention, referred to as bimorph piezoelectric element 300. FIG. 3A illustrates bimorph piezoelectric element 300 prior to application of an electric field thereto, while FIG. 3B illustrates the element after application of an electric field. For ease of illustration, electrodes for applying an electric field to piezoelectric element 300 have been omitted from FIGS. 3A and 3B.

Bimorph piezoelectric element 300 comprises first and second piezoelectric layers 302 separated by a flexible passive layer 304. Each piezoelectric layer 302 is mounted to opposing sides of passive layer 304. It would be appreciated that passive layer 304 may be any one or more of a number of different materials. In one embodiment, layer 304 is a metal layer, and more specifically, a metal foil layer. In the illustrative arrangement of FIGS. 3A and 3B, passive layer 304 is substantially thinner and thus more flexible than layer 204 implemented in unimorph piezoelectric element 200. In still other embodiments, passive layer 304 may comprises a plurality of couplings or connectors extending between piezoelectric layers 302. In such embodiments, the connectors may be separated by air gaps and passive layer 304 may be partially or substantially formed by such air gaps.

In the exemplary configuration of FIG. 3A, layers 302, 304 each have a generally planar orientation. In these embodiments, layers 302A and 302B each have opposing directions of polarization. As such, when an electric field is applied to piezoelectric layers 302, layer 302A expands longitudinally as illustrated by arrows 306, while layer 302B contracts longitudinally as illustrated by arrows 308. Due to the opposing expansion and contraction, the centers of layers 302 and 304 deflect in the direction illustrated by arrow 305. As previously noted, due to the opposing expansion and contraction of layers 302A and 302B, bimorph piezoelectric element 300 generates more deflection than that provided by comparable unimorph piezoelectric elements. The deflection of layers 302, 304 is used to output a mechanical force that generates vibration of the recipient's skull.

In the embodiments of FIGS. 3A and 3B, bimorph piezoelectric element 300 comprises two piezoelectric strip layers 302 having generally rectangular geometries. However, in accordance with other embodiments of the present invention, piezoelectric layers 302 may comprise, for example, piezoelectric disks or piezoelectric plates. Additionally, it would be appreciated that each piezoelectric layer may comprise one or a plurality of piezoelectric sheets having the same or different piezoelectric properties.

Additionally, FIGS. 3A and 3B illustrate embodiments in which the layers 302 and 304 are planar prior to application of an electric field to layers 302. However, it would be appreciated that in alternative embodiments, layers 302 and 304 may have a concave shape prior to application of the electric field.

Figure 4A:
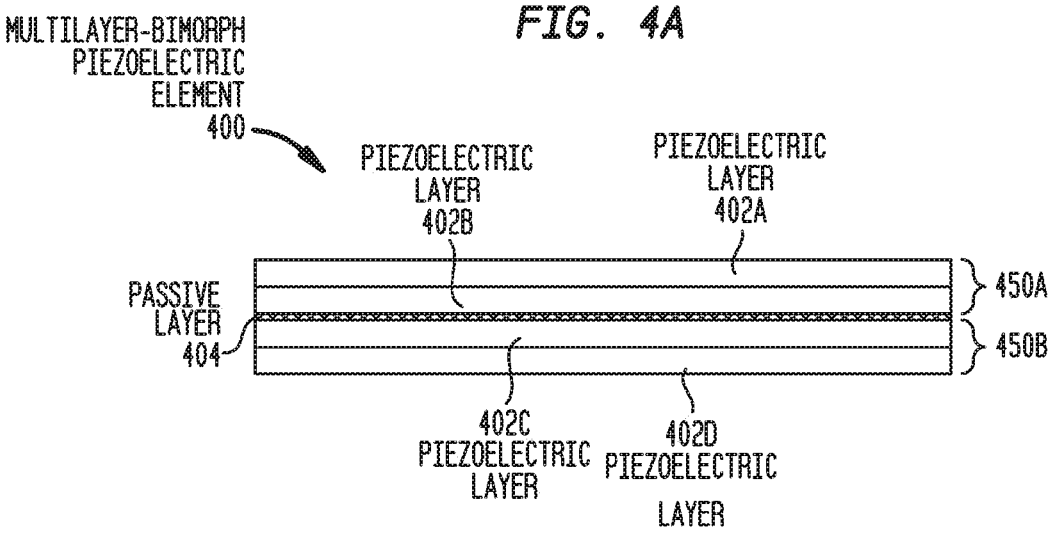
FIG. 4A is a schematic side view of a multilayer-bimorph piezoelectric element which may be implemented in embodiments of the present invention, shown prior to application of an electric field to the element.
Figure 4B:
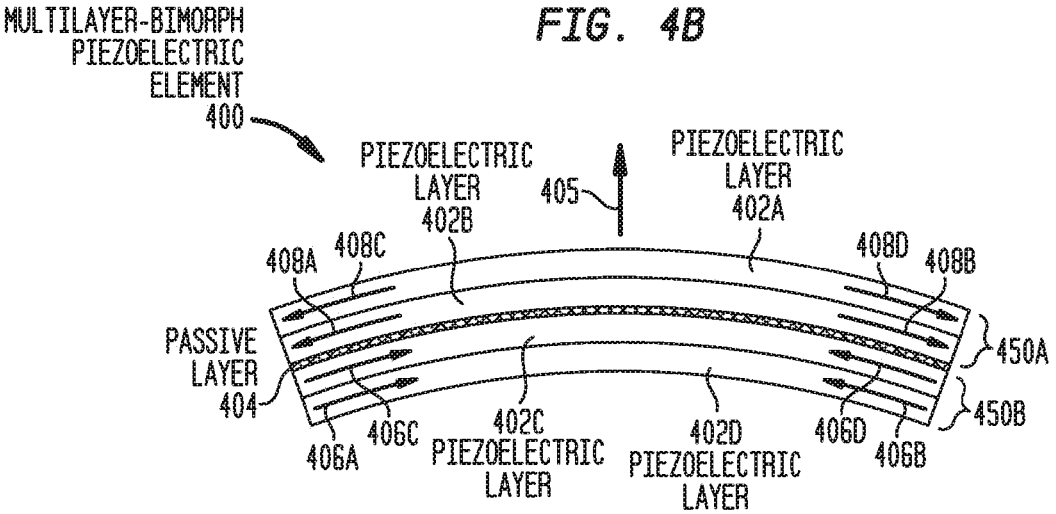
FIG. 4B is a schematic side view of the multilayer bimorph piezoelectric element of FIG. 4A, shown after application of an electric field to the element.

FIGS. 4A and 4B are schematic side view of another multilayer piezoelectric element which may be implemented in embodiments of the present invention, referred to as multilayer-bimorph piezoelectric element 400. FIG. 4A illustrates multilayer-bimorph piezoelectric element 400 prior to application of an electric field thereto, while FIG. 4B illustrates the element after application of an electric field. For ease of illustration, electrodes for applying an electric field to piezoelectric element 400 have been omitted from FIGS. 4A and 4B.

Multilayer-bimorph piezoelectric element 400 comprise two pairs 450 of piezoelectric layers 402 each having, in the exemplary configuration of FIG. 4A, a generally planar orientation . . . . A first pair 450A of piezoelectric layers 402A and 402B are mounted to one another and have a first direction of polarization. The other pair 450B of piezoelectric layers 402C and 402D are also mounted to one another, but have a second directional of polarization that is opposite to the first polarization direction. Pairs 450 are separated from one another by a passive layer 404. Similar to the embodiments described above, passive layer may be any one or more of a number of different materials. In one embodiment, layer 404 is a metal layer, and more specifically, a metal foil layer. In the illustrative arrangement of FIGS. 4A and 4B, passive layer 404 is substantially thinner and thus more flexible than layer 204 implemented in unimorph piezoelectric element 200. In still other embodiments, passive layer 404 may comprises a plurality of couplings or connectors extending between piezoelectric layers 402. In such embodiments, the connectors may be separated by air gaps and passive layer 404 may be partially or substantially formed by such air gaps.

When an electric field is applied to piezoelectric layers 402, layers 402A and 402B expand longitudinally as illustrated by arrows 408, while layers 402C and 402D contract longitudinally as illustrated by arrows 406. Due to the opposing expansion and contraction, the centers of layers 402 and 404 deflect in the direction illustrated by arrow 405. As described elsewhere herein, the deflection of layers 402, 404 is used to output a mechanical force that generates vibration of the recipient's skull.

In the embodiments of FIGS. 4A and 4B, multilayer-bimorph piezoelectric element 400 is shown comprising multiple piezoelectric strip layers 402 having generally rectangular geometries. However, in accordance with other embodiments of the present invention, piezoelectric layers 402 may comprise, for example, piezoelectric disks or piezoelectric plates. It would also be appreciated that the use of four layers in FIGS. 4A and 4B is merely illustrative, and additional layers may be added in further embodiments. Additionally, it would be appreciated that each piezoelectric layer may comprise one or a plurality of piezoelectric sheets having the same or different piezoelectric properties.

Additionally, FIGS. 4A and 4B illustrate embodiments in which the layers 402 and 404 are planar prior to application of an electric field to layers 402. However, it would be appreciated that in alternative embodiments, layers 402 and 404 may have a concave shape prior to application of the electric field.

Figure 4C:
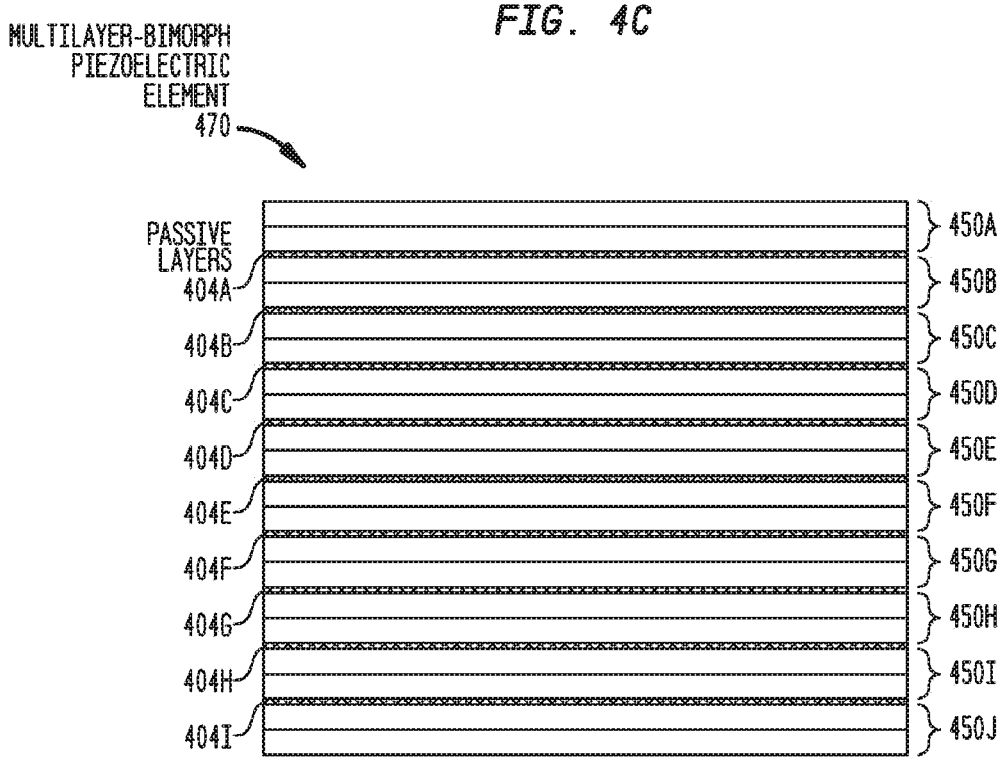
FIG. 4C is a schematic side view of another multilayer-bimorph piezoelectric element which may be implemented in embodiments of the present invention.

As noted above, FIGS. 4A and 4B illustrate a multilayer-bimorph piezoelectric element having two pairs 450 of piezoelectric elements separated by a passive layer 404. It would be appreciated that these embodiments are merely illustrative and other arrangements may be implemented in embodiments of the present invention. FIG. 4C illustrates one other such alternative arrangement for a multilayer-bimorph piezoelectric element 470 comprising ten (10) stacked pairs 450 of piezoelectric layers. Each of the pairs 450 are separated by a passive layer 404. It would be appreciated that different numbers of stacked pairs 450 may be implemented in other embodiments.

Figure 4D:
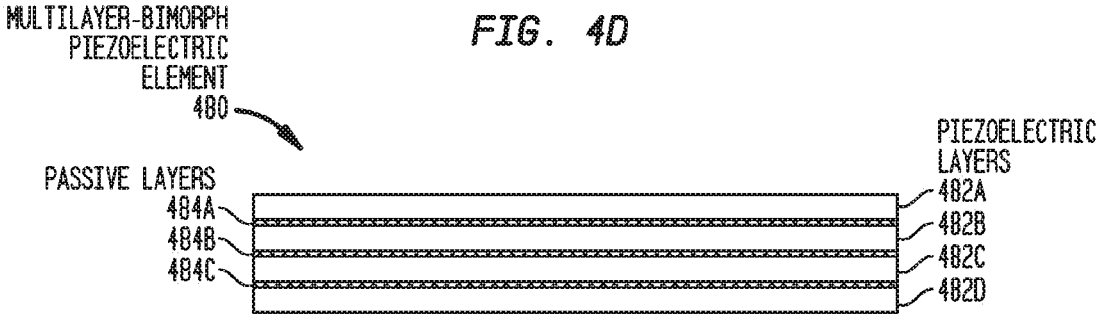
FIG. 4D is a schematic side view of a still other multilayer-bimorph piezoelectric element which may be implemented in embodiments of the present invention.

Additionally, as noted above, FIGS. 4A and 4B illustrate embodiments in which layers 402A and 402B have the same direction of polarization, and are separated from layers 402C and 402D having an opposing polarization. FIG. 4D illustrates a specific alternative embodiment of a multilayer-bimorph piezoelectric element 480 comprising a plurality of stacked piezoelectric layers 480. In these embodiments, each of the layers 480 are separated by a flexible passive layer 484. Passive layers 484 may be substantially similar to passive layer 404 described above.

Figure 5:
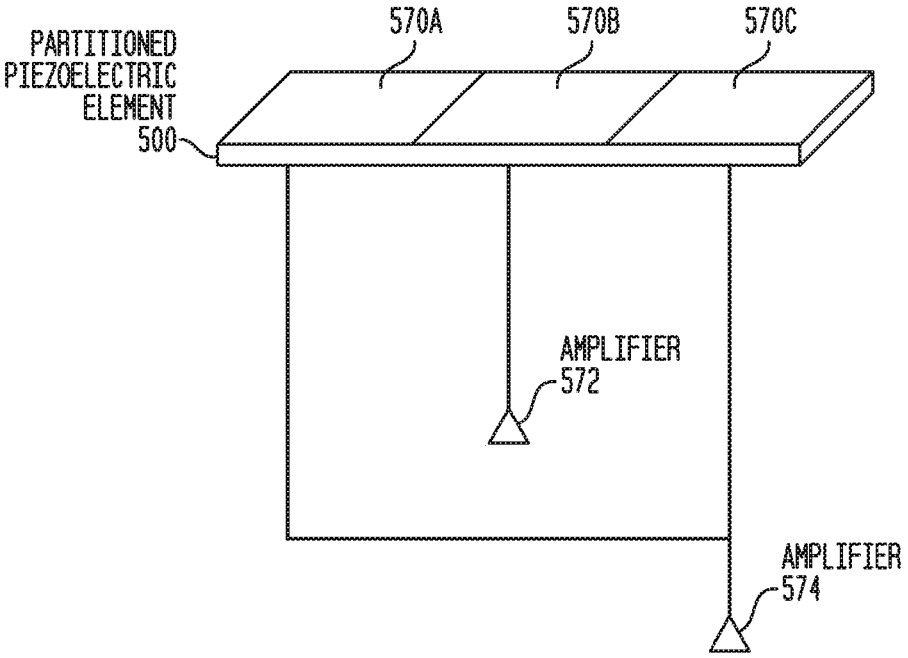
FIG. 5 is a schematic perspective view of a partitioned piezoelectric element which may be implemented in embodiments of the present invention.

FIG. 5 is a schematic perspective view of a partitioned piezoelectric element 500 in accordance with embodiments of the present invention. As shown, piezoelectric element 500 comprises three independently drivable, adjacent segments 570. That is, piezoelectric element 500 is configured such that each segment 570 may be actuated substantially independently from the other adjacent segments. In the embodiments of FIG. 5, piezoelectric element may comprise any of the piezoelectric elements described above with reference to FIGS. 2-4B. In certain embodiments, piezoelectric element 500 comprises a partitioned multilayer piezoelectric element.

In the embodiments of FIG. 5, segment 570B is electrically connected to an amplifier 572 which is configured to apply an electric field to segment 570B via one or more electrodes (not shown). However, segments 570A and 570C are each electrically connected to amplifier 574. In certain circumstances, amplifier 572 and the electrodes may be operated to deliver an electric field to segment 570B, while amplifier 574 remains inactive. In such circumstances, segment 570B will deflect to generate a mechanical force for delivery to the recipient's skull. Similarly, amplifier 574 and the electrodes may be operated to apply an electric field to segments 570A and 570C, while amplifier 572 remains inactive. Again, in such circumstances, segments 570A and 570C will deflect to generate a mechanical force for delivery to the recipient's skull.

The determination of which segments 570 to actuate may be based on a number of factors. In one specific embodiment, amplifier 572, and thus segment 570B, is activated in response to receipt by the device of high frequency signals, while amplifier 574, and thus segments 570A and 570C, is activated in response to low frequency signals. In such specific embodiments, the force generated by the deflection of segment 570B causes perception of high frequency sound signals, while deflection of segments 570A and 570C result in perception of low frequency sound signals.

Figure 6:
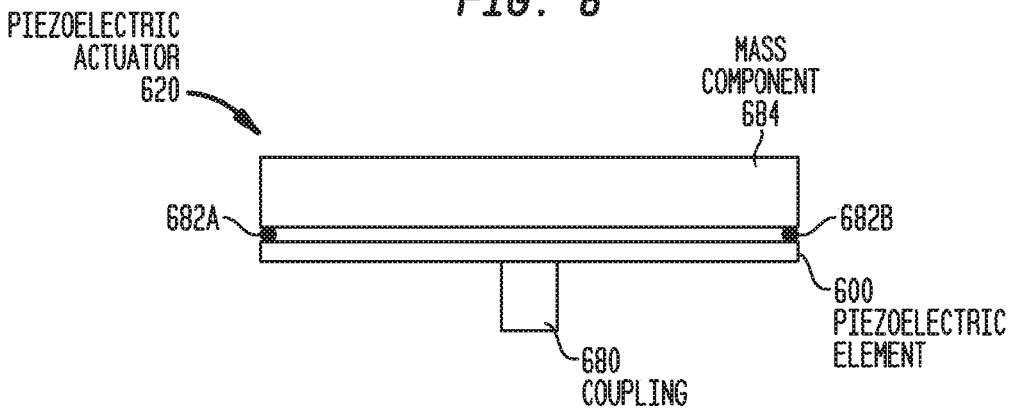
FIG. 6 is a schematic side view of a multilayered piezoelectric actuator having a single counter-mass, in accordance with embodiments of the present invention.

As noted above, in order to generate sufficient force to vibrate a recipient's skull, at least one mass component is mechanically attached to the piezoelectric element. FIG. 6 is a schematic diagram of a piezoelectric actuator 620 comprising a piezoelectric element 600 attached to a mass 684 by two connectors 682. Connectors 682 may comprise, for example, hinges, clamps, adhesive connections, etc., which are connected to a first side of piezoelectric element 600. Attached to the opposing second side of piezoelectric element 600 is a coupling 680. It would be appreciated that any of the piezoelectric elements described above with reference to FIGS. 2-5 may be implemented as piezoelectric element 600.

Similar to the embodiments described above, coupling 680 is utilized to transfer the mechanical force generated by piezoelectric actuator 620 to the recipient's skull. In certain embodiments, coupling 680 may comprise a bayonet coupling, a snap-in or on coupling, a magnetic coupling, etc.

In embodiments of the present invention, mass 684 is piece of material such as tungsten, tungsten alloy, brass, etc, and may have a variety of shapes. Additionally, the shape, size, configuration, orientation, etc., of mass 684 may be selected to optimize the transmission of the mechanical force from piezoelectric actuator 620 to the recipient's skull. In specific embodiments, mass 684 has a weight between approximately 3 g and approximately 50 g. Furthermore, the material forming mass 684 may have a density between approximately 6000 kg/m3 and approximately 22000 kg/m3.

Figure 7:
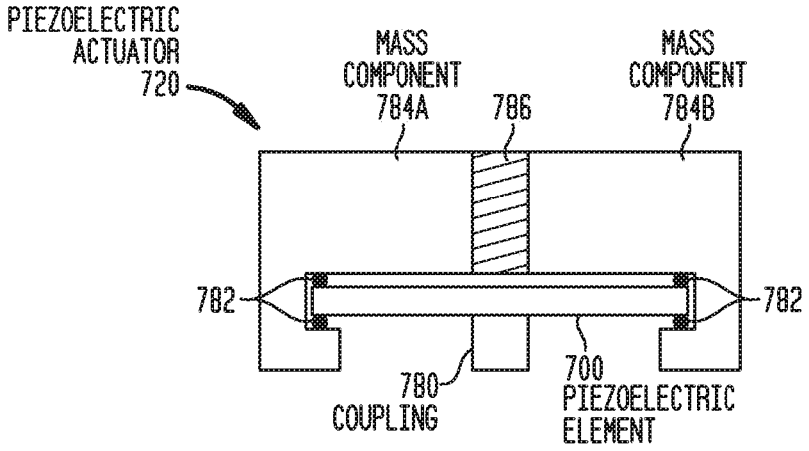
FIG. 7 is a schematic side view of a multilayered piezoelectric actuator having a dual counter-mass system, in accordance with embodiments of the present invention.

FIG. 6 illustrates embodiments of the present invention in which one mass is attached to a piezoelectric element. FIG. 7 illustrates an alternative configuration for a piezoelectric actuator 720 utilizing a dual mass system. As shown, piezoelectric actuator 720 comprises a piezoelectric element 700 as described above with reference to any of FIGS. 2-5. Two mass components 784A, 784B are attached to the ends of piezoelectric element 700 by connectors 782. More particularly, first mass component 784A is attached to a first end of piezoelectric element 700 by a first set of connectors 782. Second mass component 784B is independently attached to a second end of piezoelectric element 700 by a second set of connectors 782. Piezoelectric actuator 720 further includes a mechanical damping member 786 disposed between mass components 784. Damping member 786 may comprise a material that is designed to mechanically isolate mass components 784 from one another. Exemplary such materials include, but are not limited to, silicone, IsoDamp, ferrofluids, etc. IsoDamp is a trademark of Cabot Corporation. In an alternative arrangement, damping members may also be placed between piezoelectric element 700 and mass components 784.

As shown, piezoelectric element 700 is also attached to coupling 780 which is utilized to transfer the mechanical force generated by piezoelectric actuator 720 to the recipient's skull. In certain embodiments, coupling 780 may comprise a bayonet coupling, a snap-in or on coupling, a magnetic coupling, etc.

Figure 8:
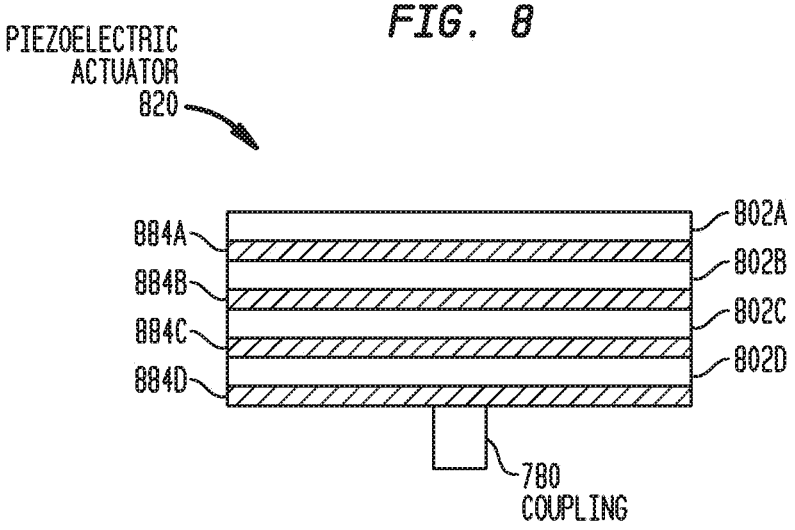
FIG. 8 is schematic side view of a multilayered piezoelectric actuator having interspersed counter-mass layers, in accordance with embodiments of the present invention.

FIG. 8 is a side view of another piezoelectric actuator 820 in accordance with embodiments of the present invention. As shown, piezoelectric actuator 820 comprises a plurality of stacked piezoelectric layers 802. Disposed between each of the piezoelectric layers 802 are passive, non-rigid mass layers 884. In these embodiments, passive layers 884 function to facilitate deflection of the piezoelectric layers, as described above with reference to FIGS. 2-5. However, passive layers 884 are also configured to provide mass to piezoelectric actuator 820 so that sufficient force may be generated without the need for an additional attached mass.

FIG. 8 illustrates embodiments comprising four piezoelectric layers. It would be appreciated that the embodiments of FIG. 8 are not limiting and that different numbers of layers may be implemented. Additionally, it would be appreciated that each piezoelectric layer may comprise one or a plurality of piezoelectric sheets having the same or different piezoelectric properties.

Figure 9:
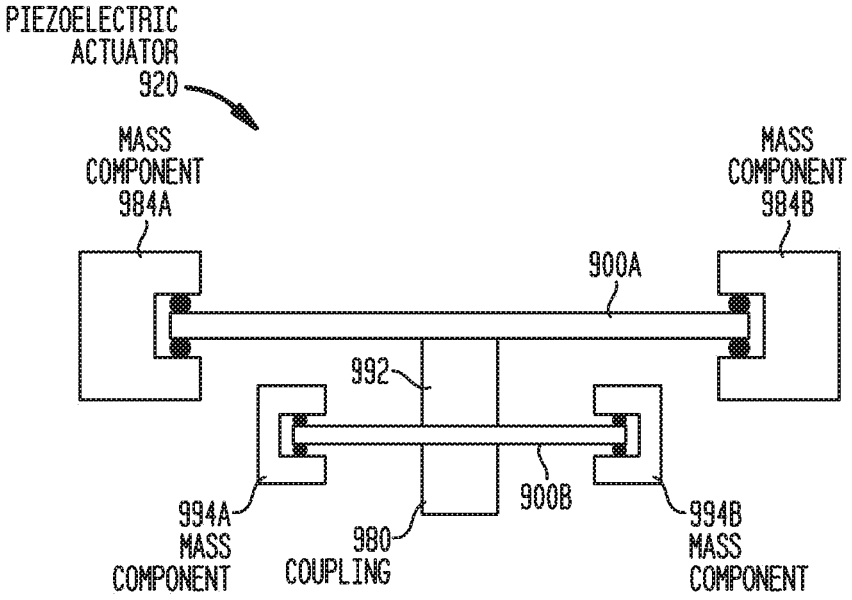
FIG. 9 is a schematic side view of a piezoelectric actuator having independent multilayered piezoelectric elements, in accordance with embodiments of the present invention.

FIG. 9 is side view of a still other piezoelectric actuator 920 which may be implemented in embodiments of the present invention. In these embodiments, piezoelectric actuator 920 comprises first and second piezoelectric elements 900A, 900B. Attached to the opposing ends of piezoelectric element 900A are two mass components 984. Similarly, attached to the opposing ends of piezoelectric element 900B are mass components 994. Piezoelectric elements 900 are connected to one another by interconnector 992, and a coupling 980 extends from piezoelectric element 900B.

In the exemplary arrangement of FIG. 9, each of the piezoelectric elements 900 are operated in response to receipt of different frequencies of sound signals. Specifically, piezoelectric element 900B is operable in response to receipt of high frequency sound signals, while piezoelectric element 900A is operable in response to receipt of low frequency sound signals.

As noted, FIG. 9 illustrates the use of piezoelectric actuator for presentation of one of the two sound frequency ranges. However, it would be appreciated that both elements may operate in the same frequency range for use in, for example, single sided deaf patients who may require representation of only high frequency signals.

In the embodiments described above, the maximum deflection of the piezoelectric elements may be the same axis as the combined center of the mass components and/or along the axis of the coupling to the skull. Such a configuration results in a balanced device.

Additionally, a piezoelectric actuator for use in a direct bone conduction device may have one or more resonant peaks within the range of approximately 300 to approximately 12000 Hz. In a specific arrangement, a piezoelectric actuator may have two resonance peaks where one peak is at less than approximately 1000 Hz, and the other peak is within the range of approximately 4000 to approximately 12000 Hz.

In a still other specific example, a piezoelectric actuator may have a resonant peak at less than approximately 300 Hz. Such an actuator may be used to transmit a tactile sensation to a recipient, rather than an audio sensation.

While various embodiments of the present invention have been described above, it should be understood that they have been presented by way of example only, and not limitation.

It will be apparent to persons skilled in the relevant art that various changes in form and detail may be made therein without departing from the spirit and scope of the invention. Thus, the breadth and scope of the present invention should not be limited by any of the above-described exemplary embodiments, but should be defined only in accordance with the following claims and their equivalents. All patents and publications discussed herein are incorporated in their entirety by reference thereto.

What is claimed is:

1. A bone conduction device for converting received sounds signals into a mechanical force for delivery to a recipient's skull, the device comprising:

a plurality of separate, independently operable multilayer piezoelectric elements each comprising two stacked piezoelectric layers, and a passive layer disposed between and mounted to the piezoelectric layers so as to separate the piezoelectric layers from each other, wherein the piezoelectric layers are configured to deform in response to application thereto of electrical signals generated based on the received sound signals;

[a mass component] *one or more mass components* attached to one or more of the multilayer piezoelectric elements so as to move in response to deformation of the one or more piezoelectric elements; and a coupling configured to attach the device to the recipient so as to transfer mechanical forces generated by the multilayer piezoelectric element and the mass component to the recipient's skull, wherein the device is configured to apply an electric signal to a first of the plurality of multilayer piezoelectric elements in response to receipt of a high frequency sound signal by the device, and wherein the device is configured to apply an electric signal to a second of the plurality of multilayer piezoelectric elements in response to receipt of a low frequency sound signal by the device.

2. The bone conduction device of claim 1, wherein the at least two piezoelectric layers of one or more of the multilayer piezoelectric elements have opposing directions of polarization such that application of electrical signals to both of the layers causes deflection of the piezoelectric element in a single direction.

3. The bone conduction device of claim 1, wherein each of the two stacked piezoelectric layers of one or more of the multilayer piezoelectric elements comprise two or more piezoelectric sheets.

4. The bone conduction device of claim 1, wherein one or more of the multilayer piezoelectric elements comprises a bimorph piezoelectric element.

5. The bone conduction device of claim 1, wherein one or more of the multilayer piezoelectric elements comprises a plurality of adjacent segments configured to be actuated substantially independently.

6. The bone conduction device of claim 5, wherein the plurality of adjacent segments comprise three adjacent segments.

7. The bone conduction device of claim 5, further comprising a plurality of amplifiers configured to selectively generate electrical signals for delivery to the plurality of adjacent segments.

8. The bone conduction device of claim 7, wherein a first of the plurality of amplifiers is configured to generate an electric signal for application to a first of the plurality of segments in response to receipt of a high frequency sound signal by the device, and wherein a second of the plurality of amplifiers is configured to generate an electric signal for delivery to a second of the plurality of segments in response to receipt of a low frequency sound signal by the device.

9. The bone conduction device of claim 1, wherein each of the piezoelectric layers comprise piezoelectric strips.

10. The bone conduction device of claim 1, wherein each of the piezoelectric layers comprise piezoelectric disks.

11. The bone conduction device of claim 1, wherein the [mass component] *one or more mass components* comprises a plurality of separate mass components *attached at different locations of the one or more piezoelectric elements*.

12. The bone conduction device of claim 11, wherein the plurality of mass components are separated by a vibration damping element.

13. The bone conduction device of claim 1, wherein the [mass components] *one or more mass components* comprise the passive layer disposed between the piezoelectric layers.

14. A bone conduction device for converting received sound signals into a mechanical force for delivery to a recipient's skull, the device comprising:

a multilayer piezoelectric element comprising two stacked piezoelectric layers separated from each other by a non-conductive passive layer, wherein the piezoelectric layers have opposing directions of polarization such that application of electric signals, generated based on the sound signals, to both of the layers causes deflection of the piezoelectric element in a single direction and wherein the multilayer piezoelectric element comprises a plurality of adjacent segments configured to be actuated substantially independently;

a plurality of amplifiers configured to selectively generate electrical signals for application to the plurality of adjacent segments;

[a mass component] *one or more mass components* attached to the multilayer piezoelectric element so as to move in response to deformation of the piezoelectric element; and a coupling configured to attach the device to the recipient so as to transfer mechanical forces generated by the multilayer piezoelectric element and the mass component to the recipient's skull.

15. The bone conduction device of claim 14, wherein each of the two stacked piezoelectric layers comprise two or more piezoelectric sheets.

16. The bone conduction device of claim 14, wherein the multilayer piezoelectric element comprises a bimorph piezoelectric element.

17. The bone conduction device of claim 14, wherein the plurality of adjacent segments comprise three adjacent segments.

18. The bone conduction device of claim 14, wherein a first of the plurality of amplifiers is configured to generate an electric signal for application to a first of the plurality of segments in response to receipt of a high frequency sound signal by the device, and wherein a second of the plurality of amplifiers is configured to generate an electric signal for application to a second of the plurality of segments in response to receipt of a low frequency sound signal by the device.

19. The bone conduction device of claim 14, wherein each of the piezoelectric layers comprise piezoelectric strips.

20. The bone conduction device of claim 14, wherein each of the piezoelectric layers comprise piezoelectric disks.

21. The bone conduction device of claim 14, wherein the [at least one mass component] *one or more mass components* comprises a plurality of separate mass components *attached at different locations of the one or more piezoelectric elements*.

22. The bone conduction device of claim 21, wherein the plurality of mass components are separated by a vibration damping element.

23. The bone conduction device of claim 14, wherein the [mass components] *one or more mass components* comprise the passive layer disposed between the piezoelectric layers.

24. The bone conduction device of claim 14, further comprising:

a plurality of separate, independently operable multilayer piezoelectric elements.

25. The bone conduction device of claim 24, wherein the device is configured to apply an electric signal to a first of the plurality of multilayer piezoelectric elements in response to receipt of a high frequency sound signal by the device, and wherein the device is configured to apply an electric signal to a second of the plurality of multilayer piezoelectric elements in response to receipt of a low frequency sound signal by the device.

* * * * *